(12) United States Patent
McCoy

(10) Patent No.: US 10,323,975 B2
(45) Date of Patent: Jun. 18, 2019

(54) NON-INTRUSIVE ULTRASONIC MEASURING OF FLUIDS IN A BEVERAGE KEG

(71) Applicant: KEGSAFE LLC., Beaumont, TX (US)

(72) Inventor: Mark James McCoy, Beaumont, TX (US)

(73) Assignee: Kegsafe LLC, Beaumont, TX (US)

( * ) Notice: Subject to any disclaimer, the term of this patent is extended or adjusted under 35 U.S.C. 154(b) by 190 days.

(21) Appl. No.: 15/394,405

(22) Filed: Dec. 29, 2016

(65) Prior Publication Data

US 2018/0188099 A1      Jul. 5, 2018

(51) Int. Cl.
| G01F 23/296 | (2006.01) |
| B67D 1/00 | (2006.01) |

(52) U.S. Cl.
CPC .......... *G01F 23/2962* (2013.01); *B67D 1/00* (2013.01)

(58) Field of Classification Search
CPC .... G01F 23/28; G01F 23/296; G01F 23/2961; G01F 23/2962; G01F 23/2968
USPC ............................................ 73/290 R, 290 V
See application file for complete search history.

(56) References Cited

U.S. PATENT DOCUMENTS

| 3,212,335 | A | | 10/1965 | Guiffre |
| 3,745,829 | A | * | 7/1973 | Franchi ............... G01F 23/2962 310/335 |
| 3,956,934 | A | | 5/1976 | White |
| 4,220,048 | A | | 9/1980 | Grepiotis et al. |
| 4,248,087 | A | | 2/1981 | Dennis et al. |
| 4,353,258 | A | | 10/1982 | Hunter |
| 4,770,038 | A | * | 9/1988 | Zuckerwar ............ F17C 13/021 310/338 |
| 4,901,245 | A | | 2/1990 | Olson et al. |
| 5,195,058 | A | | 3/1993 | Simon |
| 5,440,930 | A | | 8/1995 | Daire et al. |
| 5,511,694 | A | | 4/1996 | Rohm |
| 6,260,414 | B1 | | 7/2001 | Brown et al. |
| 6,324,911 | B1 | * | 12/2001 | Scarffe ................. B67D 1/0057 73/290 V |
| 6,581,459 | B1 | | 6/2003 | Lichtenfels, II |
| 6,615,657 | B2 | | 9/2003 | Hongerholt et al. |
| 7,255,003 | B2 | | 8/2007 | Schneiter |

(Continued)

FOREIGN PATENT DOCUMENTS

| JP | 2001221671 | 8/2001 |
| WO | WO 1999057527 A1 | 11/1999 |
| WO | WO 2012010659 A1 | 1/2012 |

*Primary Examiner* — Benjamin R Schmitt
(74) *Attorney, Agent, or Firm* — Eric W. Cernyar

(57) ABSTRACT

A transducer positioning device and a system for employing a transducer positioning device are used to determine and monitor fluid levels in a pressurized beverage keg that has a dip tube. One fluid is a liquid beverage. The other fluid is a compressed gas injected to push the beverage up through the dip tube. Each embodiment of the positioning device generally includes an acoustic transducer and a transducer support, and often includes a base. Other embodiments may include an angled adapter for the transducer and a prop and/or wheels for the base. Each embodiment of the system generally includes the transducer positioning device, a transceiver, software, and a graphic user interface, as well as wiring and a medium for data transmission. Other embodiments include at least one other electronic controller. The above may also be embodied as kits and methods.

18 Claims, 8 Drawing Sheets

(56) References Cited

U.S. PATENT DOCUMENTS

| | | | |
|---|---|---|---|
| 7,694,560 B1 | 4/2010 | Dam et al. | |
| 7,905,143 B2 | 3/2011 | Lagergren | |
| 8,201,446 B2 | 6/2012 | Kingdon | |
| 8,925,382 B1 | 1/2015 | Beal et al. | |
| 9,221,667 B2 | 12/2015 | Hershberger et al. | |
| 9,485,549 B2 | 11/2016 | Hershberger et al. | |
| 2002/0184945 A1* | 12/2002 | Chase | G01F 23/2961 73/290 V |
| 2005/0000737 A1 | 1/2005 | Fox et al. | |
| 2014/0166374 A1 | 6/2014 | Deng et al. | |
| 2016/0216148 A1 | 7/2016 | Stangl et al. | |
| 2016/0264394 A1 | 9/2016 | Hershberger et al. | |
| 2017/0107467 A1* | 4/2017 | Bailey | C12H 1/16 |

\* cited by examiner

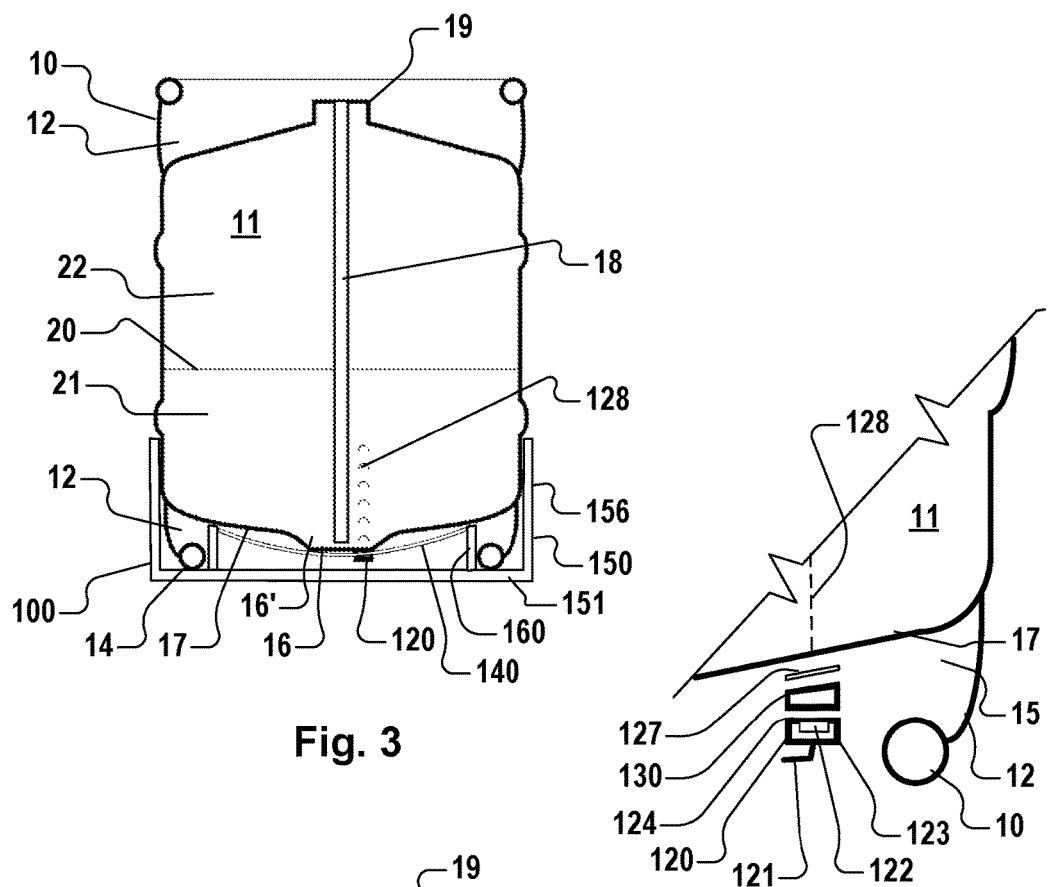
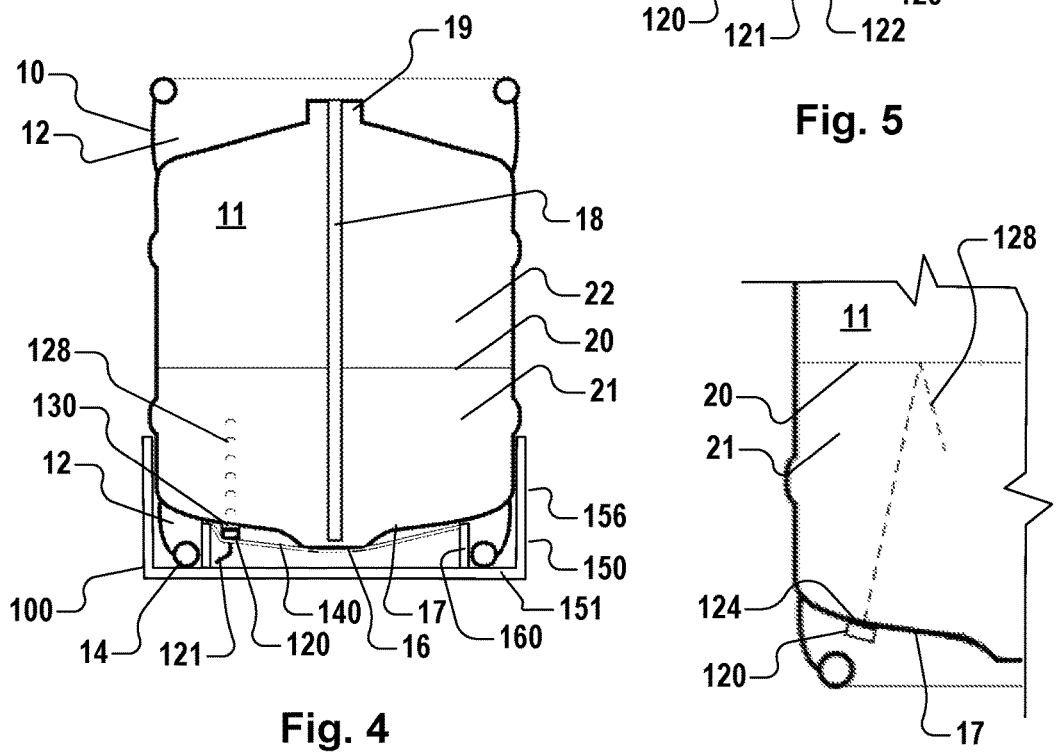
Fig. 3
Fig. 5
Fig. 4
Fig. 6

NON-INTRUSIVE ULTRASONIC MEASURING OF FLUIDS IN A BEVERAGE KEG

TECHNICAL FIELD

The present disclosure generally relates to a device and system for monitoring fluid levels in a beverage keg and for preventing beverage keg "blowout," and associated kits and methods for implementing such device and system.

BACKGROUND

All bar or restaurant owners have a problem monitoring the amount of usable beer or wine remaining in the system, as beverage kegs are sealed pressure vessels that mask their content. Current inaccurate options for determining keg content typically include weighing the keg and its contents, lifting the keg to estimate the beer or wine volume, and zeroing a flow meter when a keg is full and subtracting out measured flow to estimate a remaining volume.

A related problem within the draft beer industry is called "blowing a keg." Carbon dioxide gas enters the keg through a hose distribution system coupled to a valve assembly atop the keg's neck, creating pressure in the keg and pushing the beverage up the dip tube. When there is a sufficient liquid in a keg, the opening in the bottom of the dip tube is below the surface of the liquid, and only liquid enters the dip tube. However, when the liquid in the keg drops low enough, $CO_2$ enters the dip tube and the hose connecting the keg to the tap dispenser. The tap begins to dispense foam, and $CO_2$ gas pockets blow portions of liquid at a high rate out of the tap. Bartenders refer to this as a "beer shower." Now soaked, the bartender must go replace the empty keg. Once the bartender gets back, the tap must be opened to release all the gas that has entered the hose. Additional $CO_2$, foam, and foamy liquid must be dispensed until a good, solid stream of liquid is seen. The mess and wasted beer are problems.

Owners make many assumptions, including delivery of a full keg, a correct number of ounces in each mug served, that the bartender collects money for every ounce poured, and that "beer showers" are an unavoidable aspect of the business. These various losses may easily cost an owner about fifteen percent of profits. Yet this profit loss is presently commercially undetectable.

There is need in the art for accurate, real-time measurements and warnings to help uncover theft and other losses, and to help bartenders manage liquid inventory within a keg while avoiding the unpleasant problems associated with blowing a keg.

SUMMARY

A transducer positioning device, for use with a pressurized beverage keg that has a dip tube, generally includes an acoustic transducer and a transducer support, and usually includes a base. Other embodiments may include an angled adapter for the transducer and a prop and/or wheels for the base. A piezoelectric acoustic transducer receives a first electrical pulse from a transceiver and responsively generates first acoustic energy for transmission upwardly through the bottom wall of the beverage keg. The transducer receives second acoustic energy reflected from a fluid level and responsively generates a second electrical pulse to the transceiver. (One fluid is a liquid beverage, and the other fluid is a compressed gas injected to push the beverage up through the dip tube. The fluid level is the point of contact between the two fluids.)

A system for employing a transducer positioning device to determine and monitor fluid levels in order to prevent keg blowout, for use with a pressurized beverage keg that has a dip tube, generally includes the transducer positioning device, a transceiver, software, and a graphic user interface display, as well as wiring and a medium for data transmission. Software comprises a live data feed from an on-site installation, a calculator comprising standard beverage properties data and formulas, and an actionable output of manipulated data. Other embodiments include at least one other electronic controller.

A method for preventing keg blowout generally comprises the steps of monitoring and informing, positioning a transducer, and adjusting a display. Monitoring and informing comprises setting at least one transceiver, sending and receiving signals to/from at least one transducer, relaying data from the transducer(s), manipulating data, and adjusting a display with actionable output. A user may also interactively adjust the display to affect the cycle of monitoring and informing. Positioning a transducer comprises determining the best transducer location, employing an angled adapter or prop as needed, applying a coupling material, setting a keg on a transducer, and calibrating the transducer with the transceiver.

Many different embodiments are contemplated. The above may also be embodied as kits.

Other systems, devices, methods, features, and advantages of the disclosed product and methods for employing a transducer positioning device to determine and monitor a fluid level will be apparent or will become apparent to one with skill in the art upon examination of the following figures and detailed description. All such additional systems, devices, methods, features, and advantages are intended to be included within the description and to be protected by the accompanying claims.

BRIEF DESCRIPTION OF THE DRAWINGS

The present disclosure may be better understood with reference to the following figures. Corresponding reference numerals designate corresponding parts throughout the figures, and components in the figures are not necessarily to scale.

It will be appreciated that the drawings are provided for illustrative purposes and that the invention is not limited to the illustrated embodiment. For clarity and in order to emphasize certain features, not all of the drawings depict all of the features that might be included with the depicted embodiment. The invention also encompasses embodiments that combine features illustrated in multiple different drawings; embodiments that omit, modify, or replace some of the features depicted; and embodiments that include features not illustrated in the drawings. Therefore, it should be understood that there is no restrictive one-to-one correspondence between any given embodiment of the invention and any of the drawings.

FIG. 3 illustrates in cross-section a keg placed in a transducer positioning device.

FIG. 4 illustrates in cross-section a keg placed in a transducer positioning device.

FIG. 5 is a cut-away view of a transducer and angled adapter.

FIG. 6 is a cut-away view illustrating an incorrect transducer positioning.

DETAILED DESCRIPTION

Any reference to "invention" within this document is a reference to an embodiment of a family of inventions, with no single embodiment including features that are necessarily included in all embodiments, unless otherwise stated. Furthermore, although there may be references to "advantages" provided by some embodiments, other embodiments may not include those same advantages, or may include different advantages. Any advantages described herein are not to be construed as limiting to any of the claims.

Specific quantities (spatial dimensions, temperatures, pressures, times, force, resistance, current, voltage, concentrations, wavelengths, frequencies, heat transfer coefficients, dimensionless parameters, etc.) may be used explicitly or implicitly herein, such specific quantities are presented as examples only and are approximate values unless otherwise indicated. Discussions pertaining to specific compositions of matter, if present, are presented as examples only and do not limit the applicability of other compositions of matter, especially other compositions of matter with similar properties, unless otherwise indicated.

In describing preferred and alternate embodiments of the technology described herein, as illustrated in FIGS. 1-18, specific terminology is employed for the sake of clarity. The technology described herein, however, is not intended to be limited to the specific terminology so selected, and it is to be understood that each specific element includes all technical equivalents that operate in a similar manner to accomplish similar functions.

Described below are embodiments of a transducer positioning device and a system for employing a transducer positioning device to determine and monitor a fluid level in a pressurized beverage keg that has a dip tube. One fluid is a liquid beverage. The other fluid is a compressed gas injected to push the beverage up through the dip tube. Many different embodiments are contemplated. Each embodiment of the positioning device generally includes a transducer and a transducer support, and often includes a base. Other embodiments may include an angled adapter for the transducer and a prop and/or wheels for the base. Each embodiment of the system generally includes the transducer positioning device, a transceiver, software, and a graphic user interface, as well as wiring and a medium for data transmission. Other embodiments include at least one other electronic controller. The above may also be embodied as kits and methods.

Figure 1:
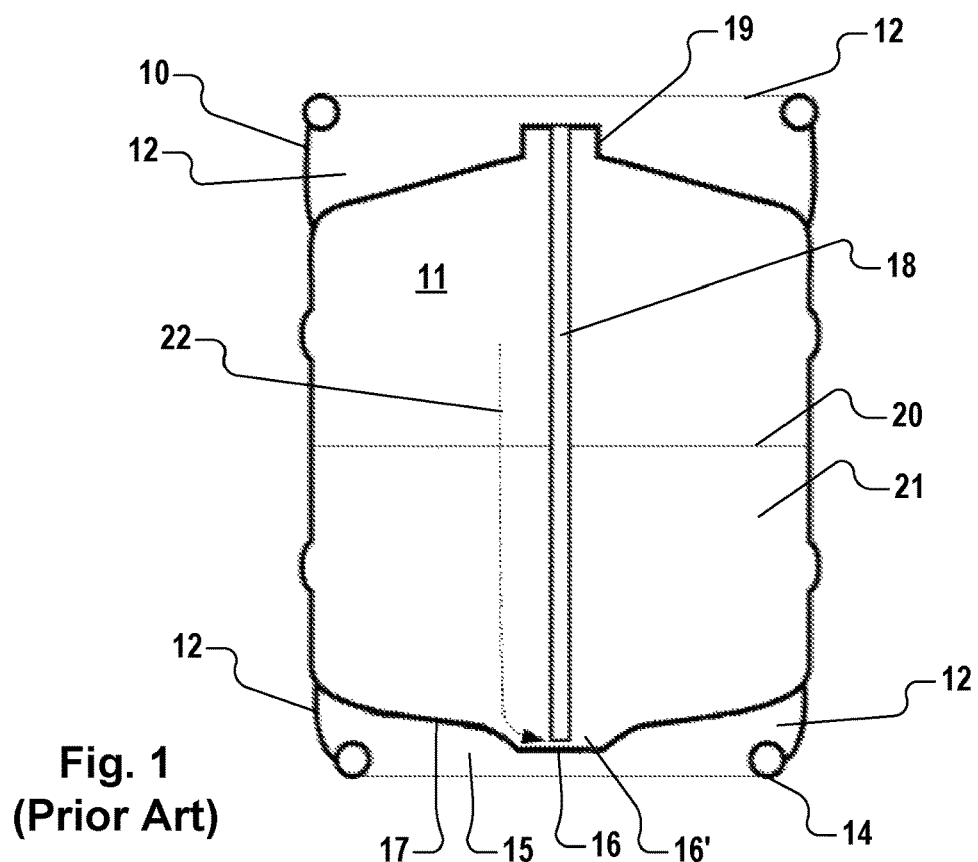
FIG. 1 (prior art) illustrates parts of a standard beverage keg in cross-section.
Figure 2:
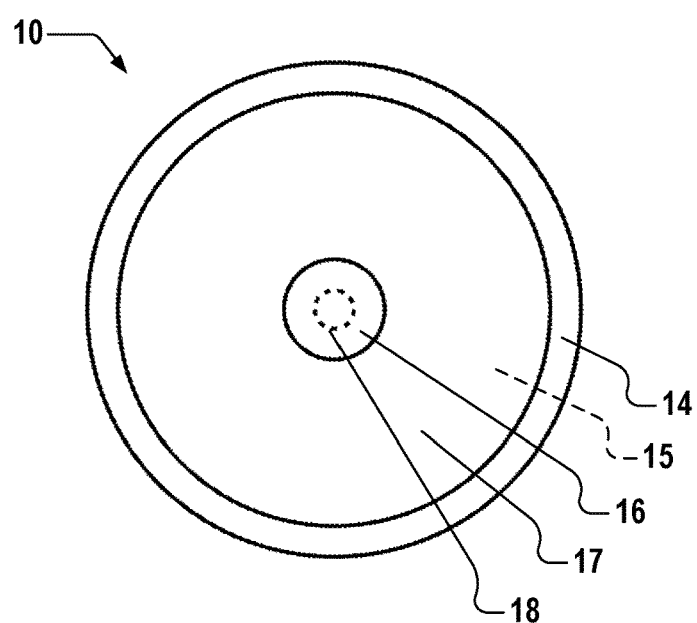
FIG. 2 (prior art) shows the bottom of a standard beverage keg.

FIG. 1 (prior art) is a cross-section that shows the parts of a standard, pressurized keg 10 that comprises a pressure vessel 11 and a dip tube 18. A bottom view of the keg 10 is shown in FIG. 2. Kegs 10 may be of various sizes and materials, but they are often constructed of non-magnetic materials such as stainless steel, aluminum, polymers, and other composites in order to aid sanitation. The keg 10 may contain wine, beer, or other beverage or liquid 21. A protective surround or chime 12 surrounds the pressure vessel 11 in order to aid storage and shipping without damage, as a full-size keg 10 may weigh up to 166 pounds or so when full. The upper portion of the chime 12 may comprise at least one handle 13 (shown elsewhere), and a lower portion of the chime 12 may comprise a lower rim 14, the lower portion of the chime hiding a false bottom 15 under the beverage keg 10.

Within the false bottom 15, the pressure vessel 11 has a sump 16' that is the lowest area of the vessel 11, designed to permit extraction of as much beverage from the keg 10 as possible, and typically comprises a substantially flat bottom sump wall 16. In this specification, the term "sump" may refer to the sump area 16' and/or the sump wall 16 (for example, an item placed under the sump 16' would also be placed under the sump wall 16). The vessel 11 has a curved bottom 17 that slopes from the side walls of the chime 12 to the sump wall 16. The sump wall 16 is often circular and located at the center of the keg 10 bottom, but the sump wall 16 is not limited to being circular or centered. A sump wall 16 may be approximately 2-4" in width or diameter (often 3"), and a dip tube 18 may occupy approximately 1" width or diameter at the center of the sump wall 16. However, the sump wall 16 and dip tube 18 are not limited to those exact dimensions. The width or diameter of the neck 19 approximates the width or diameter of the sump wall 16, even more so when couplers are secured to the neck 19 to tie the keg 10 into a dispensing system. The distance or difference between the width of the dip tube 18 and the width of the sump wall 16 is of particular importance to the present invention.

A spear or dip tube 18 descends from the neck 19 of the vessel 11 to about ½"-¾" above the sump wall 16, leaving enough clearance for liquid 21 to move from the vessel 11 into the open end of the dip tube 18. The dip tube 18 is not limited to originating at the neck 19 or to being straight as illustrated, but may originate elsewhere on the keg 10 and reach to the sump 16'. In practice, when a bartender tries to draw some of the liquid 21 from a tap, a pressurized gas 22 such as carbon dioxide is introduced into the vessel 11 via valves at the neck 19, and the gas 22 pushes the liquid 21 down and forces the drink into and up the dip tube 18 for dispensing. As liquid 21 is removed from the keg 10, the volume of gas 22 increases, the volume of liquid 21 decreases, and the fluid level 20 moves lower. The gas 22 and liquid 21 meet at the fluid level 20, which may be referred to as a fluid demarcation line or fluid surface that will tend to be level, unless there is uneven flow around the dip tube 18 as the compressed gas 22 pushes the liquid 21. The pressurized gas 22 is not limited to $CO_2$. One disadvantage of current practice is that when the liquid 21 drops below the dip tube 18, or at times prior to doing so, the pressurized gas 22 shoots up the dip tube 18 and blows foam and liquid 21 onto the bartenders and the food service area. This is referred to as "blowout."

Turning now to FIGS. 3-18, the present device and system employs one or more sensors, specifically acoustic transducers 120, temporarily placed in a stable manner below the pressure vessel 11 in order to warn the bartender and/or shut down the tap prior to a blowout. In FIG. 3, a transducer 120 placed under the sump wall 16, and with the transducer's 120 crystal 122 out from under the dip tube 18, is in an ideal position to send pressure/sound waves or signals 128 vertically to the fluid level 20, which is the surface of the liquid 21, and to receive return sound waves or signals 128. When a beverage's physical properties are known, along with a specific keg's 10 dimensions and the transducer's 120 location on that keg 10, the distance that the signals 128 travel through the beverage in a certain amount of time (the round trip time or RTT) can be used to calculate how far the compressed gas 22 at the fluid level 20 is from the bottom end of the dip tube 18. Avoiding the dip tube 18 is crucial. In other words, the ideal placement of a transducer 120 may be such that its crystal 122 is about ½" to 1½" from the center of the sump wall 16. The crystal 122 is located in essentially a "ring" around the dip tube 18 on the sump wall 16. With this placement, at the deepest point of the pressure vessel 11, the transducer 120 gives a very accurate estimate of the fluid level 20 and the amount of liquid 21 remaining until the pressurized gas 22 blows into the dip tube 18.

FIG. 4 shows an optional placement of the transducer 120 on the curved bottom 17 of the pressure vessel 11 between the sump wall 16 and the lower rim 14 of the chime 12. Measurement of the fluid level 20 still proves useful, but the face 124 of the transducer 120 is located above the end of the dip tube 18. In order to vertically orient the signals 128 to properly read the fluid level 20, an angled adapter 130 is added to the transducer 120. If an angled adapter 130 is not added (see FIG. 6), then a transducer 120 with a flat face 124 will send a signal 128 that is not vertically oriented, and a reflection or return signal 128 will not be received by the transducer 120. An angled adapter 130 causes the transducer 120 to transmit a first acoustic energy or signal 128 substantially perpendicular to the fluid level 20 to maximize the strength of the second acoustic energy or signal 128 reflected from the fluid level 20 so the reflected signal 128 may be detected by the same transducer 120.

The transducer 120 is seen more clearly in FIG. 5 in a cut-away illustration of a beverage keg 10 corner. A transducer 120 in this specification may be a piezoelectric acoustic transducer 120 that converts an electrical signal into sound pressure waves (signal 128), and vice versa. Electrical signals and power may travel over a coaxial cable or wire 121 or wirelessly to a transceiver 110 and/or an electronic controller 180 (both shown elsewhere). The transducer 120 may comprise an approximately ½" crystal 122 inside a ¾" housing 123, though the transducer 120 may be of other sizes and compositions that perform the same functionality. In practice, an installer determines whether a transducer 120 will be installed on a substantially flat sump wall 16 or, if the sump wall 16 is badly bent, on a curved bottom 17 within the false bottom 15 formed by the chime 12. If on a sump wall 16, the installer applies a generous, but thin, layer of coupling material 127, which may be petroleum jelly or grease, to the flat face 124 of the transducer 120. If on a curved bottom 17, the installer selects either an angled adapter 130 or a transducer 120 with a built-in angled adapter 130, secures the adapter 130 to the flat face 124, and applies a layer of coupling material 127 to the angled adapter 130. The beverage keg 10 is then placed in a way that the keg bottom 16 or 17 couples with the transducer 120 via the coupling material 127 (and angled adapter 130, if needed). The coupling material 127 may be a liquid, gel, film, or other material that provides the functionality of removably coupling a transducer 120 (or angled adapter 130) to a keg 10 without the presence of air bubbles between the two. The angled adapter 130 may be wedge-shaped with an angle of about 10-15° to provide proper orientation of the transducer 120 on a curved bottom 17 having a slope of about 10-15°. More specifically, an angle of about 12° will typically deliver a strong enough return signal 128, depending on the properties of the angled adapter 130, transducer 120, and transceiver 110. Different kegs 10 may have curvatures of varying degrees, but the produced wave/signal 128 of the transducer 120 should to be as parallel as possible to the fluid level 20 so the reflected signal 128 is directed back to and sensed by the same or a nearby located transducer 120. The angled adapter 130 may be made of a variety of materials that attenuate or bend sound waves differently, depending upon the material properties, to counteract or compensate for the refraction of sound.

In general, factors that affect a produced acoustic energy wave and signal 128 may be the keg's 10 bottom wall 16, 17 thickness and composition, the angle of the bottom wall 16, 17 with respect to the fluid level 20, and changes in material composition (the beverage or obstructions) along the path of the signal 128. These factors may have an effect individually and collectively. The piezoelectric acoustic transducer 120 has a preferred frequency of 1.5-3 MHz, making the thickness of the keg 10 bottom wall 16, 17 a non-issue, but the transducer 120 frequency is not limited to that range. A piezoelectric transducer 120 is exceedingly accurate—measuring the fluid level 20 to within a 0.001" margin of error. In contrast, current methods that weigh kegs 10 in order to estimate their remaining beverage are inferior at preventing blowout. Any weight from a foreign object, a hose bundle or coupler, or other source will lead to false readings and a soaked bartender. The transducer 120 of the present invention does not bear the load of the keg. Here it is also worth noting that the high frequency wave/signal 128 of about 2.5 MHz required to shoot through the bottom wall 16, 17 is ineffective when placed at the top of a keg 10, as that frequency will not propagate through gas 22 (which would require about 40 kHz).

Having discussed location and orientation of a transducer 120, we now refer to FIGS. 3-4, which are illustrated in cross-section, to describe a positioning device 100 utilized to properly locate and hold one or more transducers 120. FIGS. 7-13 provide supporting detail. A transducer 120 is mounted to a transducer support 140 that comprises at least one spoke 142 (which may be referred to as a strap or arm) and is configured to press the transducer 120 against the keg's bottom wall 16 and/or 17. The transducer support 140 may extend outwardly to meet a base 150 at an interior wall 160 that is configured to be positioned in the keg's 10 false bottom 15. Phrased differently, the transducer support 140 may extend inwardly from the interior wall 160 of the base 150 and be secured by the base 150. The transducer support 140 may extend outwardly in multiple directions to meet the interior wall 160 at multiple locations, and the interior wall 160 may be continuous or discontinuous. The base 150 has a bottom wall 151, comprising a lower surface 152 and a top surface 153, and an outer wall 156. The base 150 may be configured such that when the lower rim 14 of a beverage keg 10 is place on its top surface 153, the inner wall 160 and outer wall 156 of the base at least partially surround portions of the keg's 10 lower rim 14 and chime 12. The base 150 may be a boot and may fit snugly so that the keg 10 remains in the base 150 when the keg 10 is lifted, but the base 150 is not limited to a boot. The base may also comprise a place for storing a bottle of coupling material 127 for handy application.

As shown in FIGS. 3-4, when a keg 10 is placed on the base 150, a transducer support 140 may stretch between two points on an inner wall 160 of the base 150 to press at least one transducer 120 against either the sump wall 16, the curved bottom 17, or both (not shown in one drawing, but a possible configuration; for example, combining FIGS. 3 and 4). The transducer support 140 may comprise rubber, polymer, a composite, or some other material with elastic properties or "spring" that is durable and allows the transducer support to flex.

Figure 7:
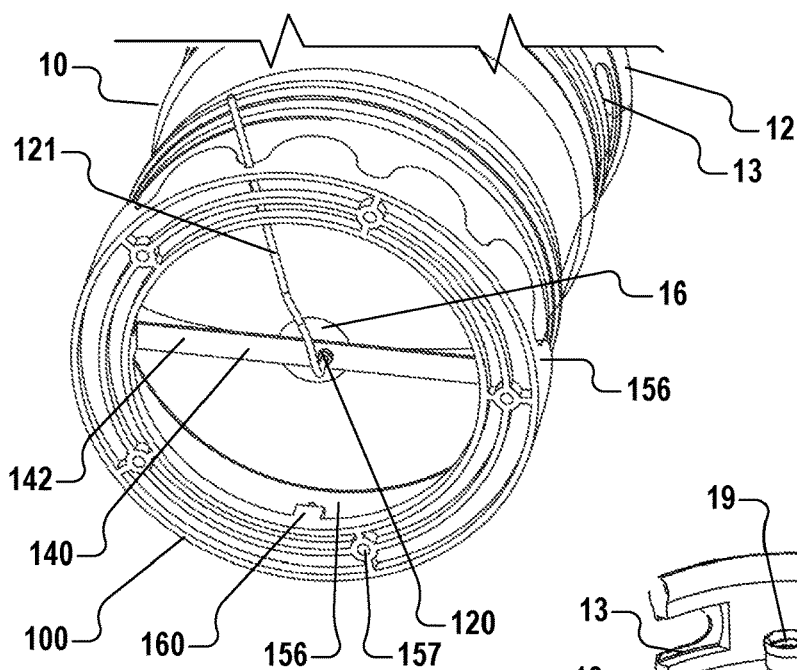
FIG. 7 is a bottom perspective view of a keg in a transducer positioning device.

As mentioned, additional detail is given in FIGS. 7-13. FIG. 7 is a perspective view of the bottom of the keg 10 with positioning device 100 in place. The bottom wall 151 of the base 150 may have a bottom surface 152 and/or may contain other features including, but not limited to, ribs 155, holes, wheel assembly apertures 157, and other structure-reinforcing and material saving parts. To allow a wire 121 to exit the base 150 without being crushed by the lower rim 14 of the keg 10, a groove or aperture (shown in part) may be cut through the bottom wall 151 of the base. The wire 121 is seen running through the ribs 155 of the bottom wall 151.

Figure 8:
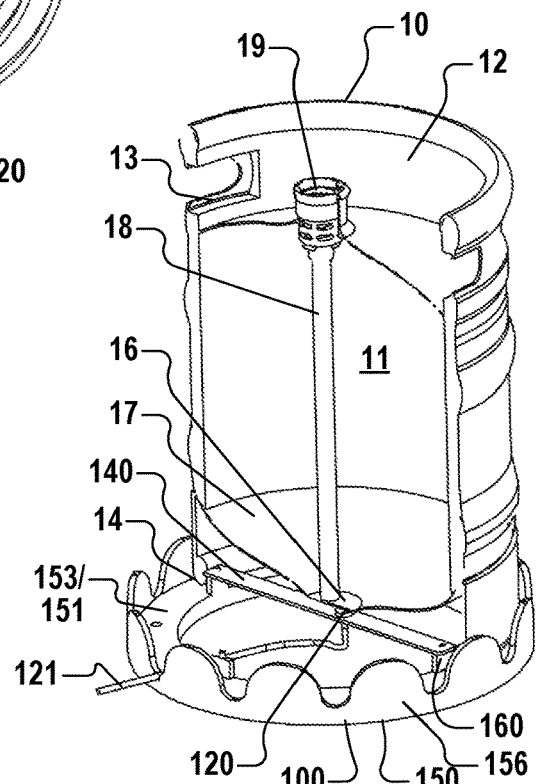
FIG. 8 illustrates the device of FIG. 7 as a side perspective view with the keg in cross-section.
Figure 9:
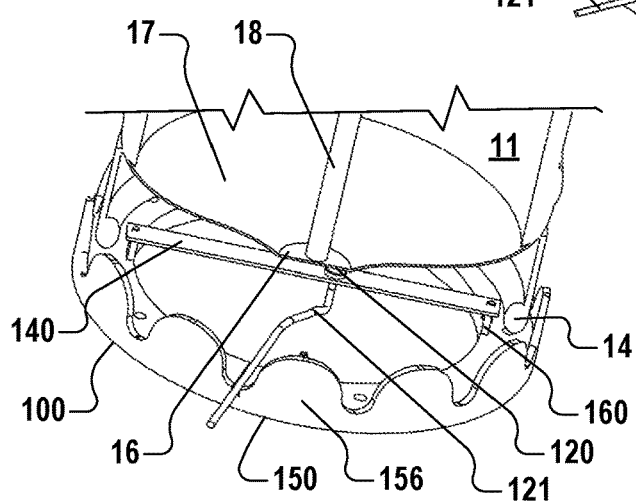
FIG. 9 illustrates a cut-away FIG. 8 viewed at a different angle.

FIGS. 8-9 utilize perspective views of a cut-away keg 10 placed on a whole positioning device 100. The top surface 153 of the base bottom wall 151 is more clearly seen, and the inner wall 160 is shown to comprise at least two discrete sections; however, the inner wall 160 is not limited to discrete sections, but may be continuous (see FIG. 13). The outer wall 156 has a scalloped pattern, but is not limited to that discontinuous pattern; additionally, the outer wall 156 may be continuous (see FIGS. 12-13). Kegs 10 may be repeatedly inserted into and removed from the base 150.

Figure 10:
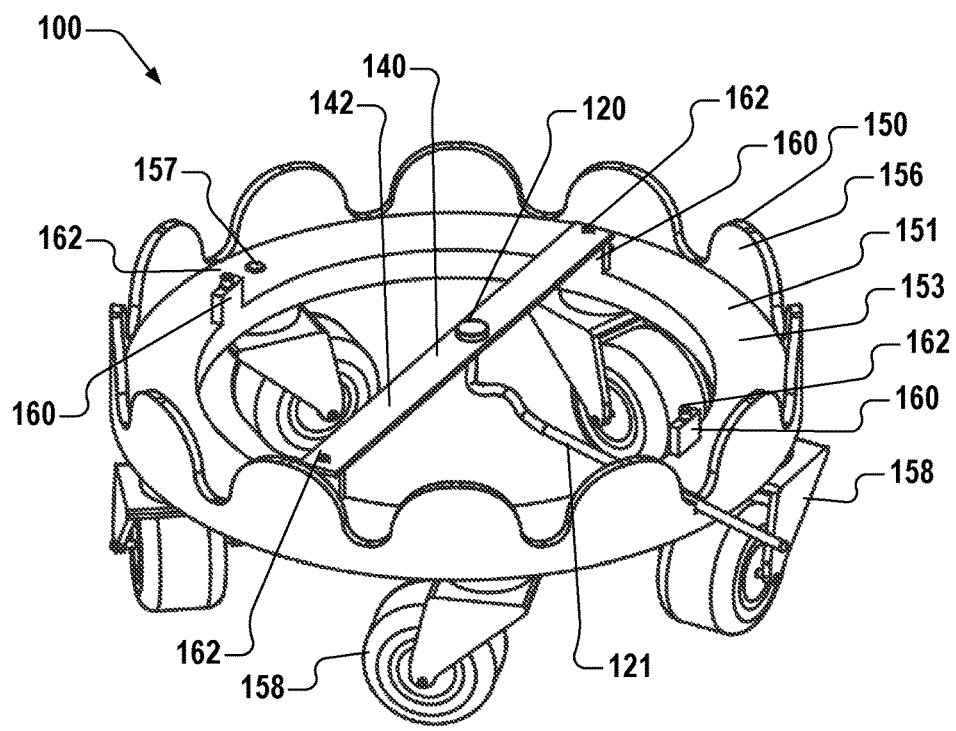
FIG. 10 is a perspective view of a transducer positioning device with wheels.
Figure 11:
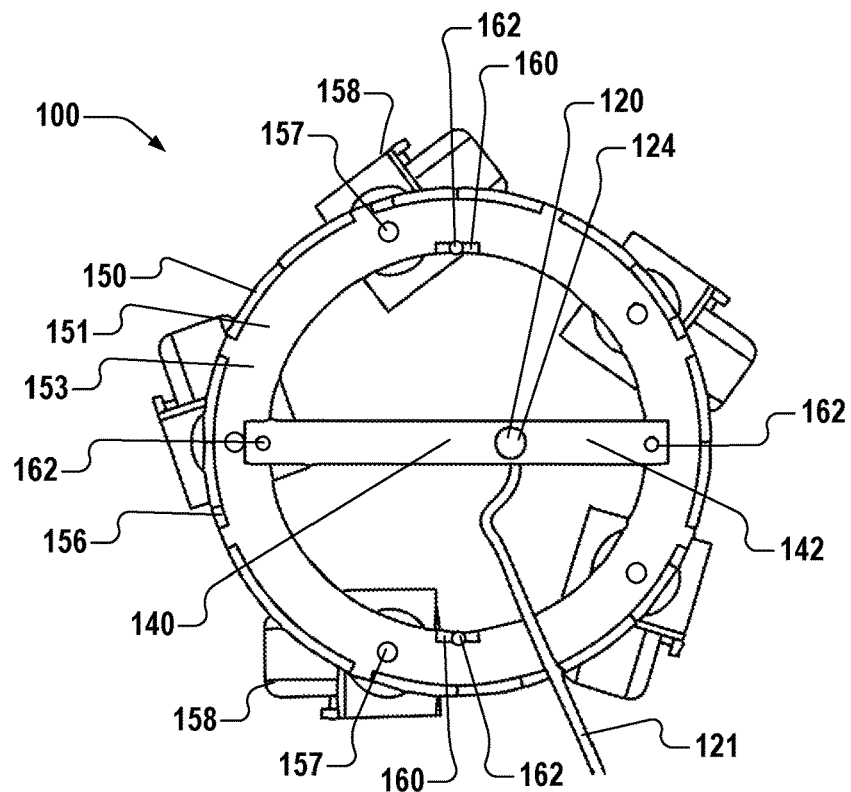
FIG. 11 is a top view the device of FIG. 10.

FIGS. 10-11 show a transducer 120 on a transducer support 140 attached to at least two portions of an inner wall 160 of a base 150. The transducer support 140 may be described as a strap or one or two spokes 142, each end of the support 140 attached to at least one nub 162 on the inner wall 160. The nub 162 may be a projection formed with the base 150 or may be a screw or pin added later, the nub 162 and transducer support 140 not being limited to those forms of attachment. For certain embodiments, wheel assemblies 158 are attached at the wheel assembly apertures 157. Wheel assemblies 158 may be any variety of wheel, caster, or other part that aids movement of the keg 10 from one location to another.

Figure 12:
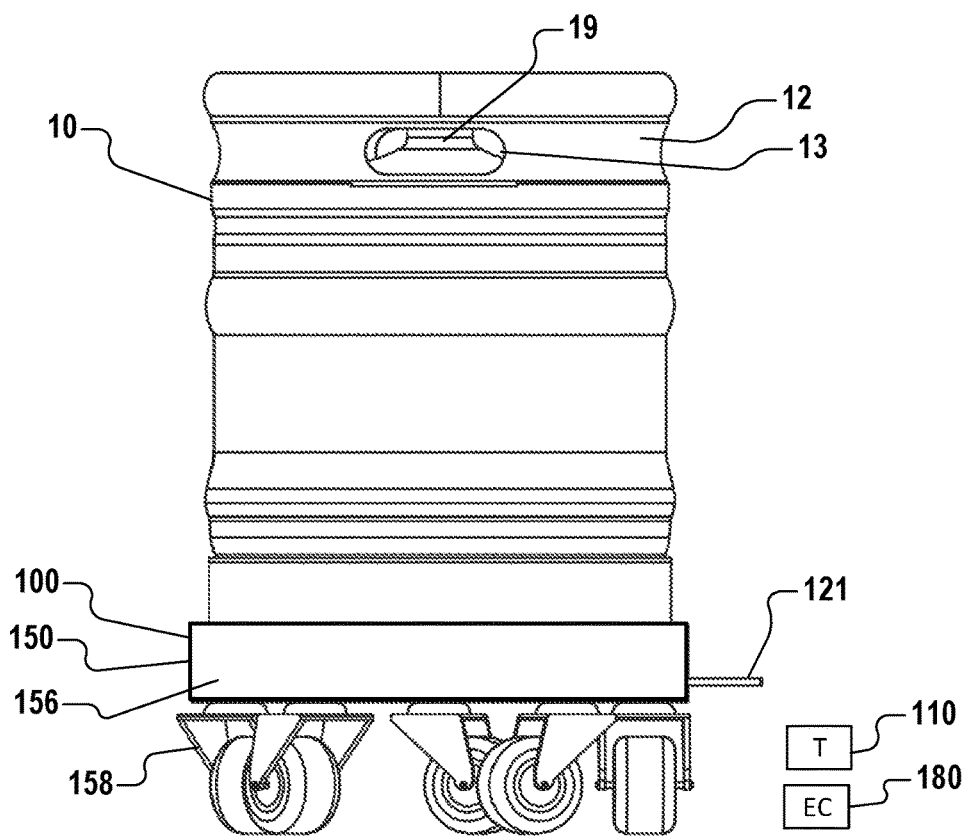
FIG. 12 is a side view a transducer positioning device holding a keg.

FIG. 12 illustrates a full-size keg 10 on a positioning device 100 whose base 150 comprises a solid, continuous outer wall 156. A wired 121 or wireless feed goes to a transceiver 110 or other electronic controller 180 that manages the transducer's 120 sending and receiving of acoustic waves/signals 128. The transceiver 110 is a microprocessor that applies an electrical voltage to one or more transducers 120 causing them to emit a pulse, and it collects and interprets all signals 128 received by the one or more transducers 120 and transmits that data via the Internet, for example. LEDs controlled and produced by the transceiver 110 indicate whether all of those elements are functioning properly. The transceiver 110 also communicates to a number of devices/apps that provide the operator with information about system function, which helps with system setup. The transceiver 110 and/or electronic controller 180 may be housed inside or outside of the positioning device 100.

Figure 13:
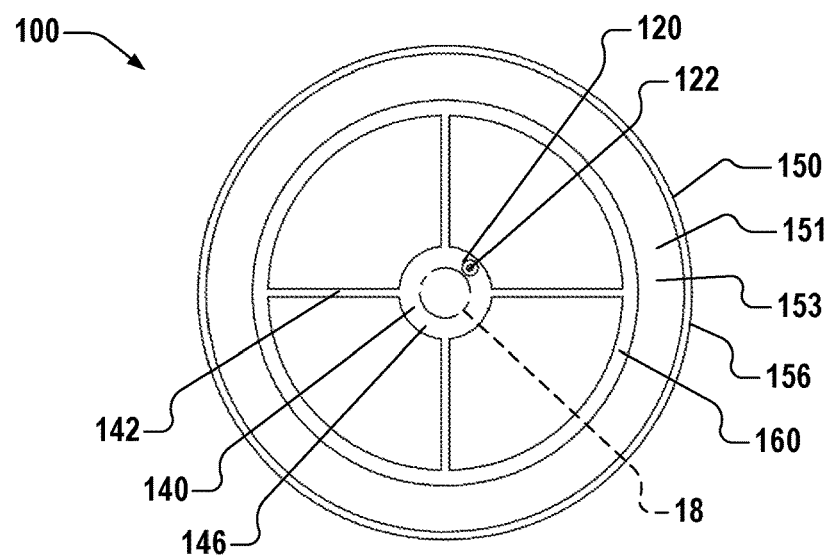
FIG. 13 is a top view of a transducer positioning device.

FIG. 13 is a top view of a positioning device 100 having a largely donut-shaped boot or base 150 with continuous inner 160 and outer walls 156. More material in the walls 160, 156 may make for a more durable and snug-fitting base 150, but one of skill in the art will appreciate that reduction of material costs may provide more affordable use. In this embodiment, the transducer 120 is mounted on (or through or to) a transducer support 140 comprising a round platform 146 and a webbing or four spokes 142 extending outwardly to the inner wall 160. The crystal 122 of the transducer 120 is located on the transducer support 140 next to or about, but not under, the dip tube 18 (represented by a dashed circle). Thus, the crystal 122 may be substantially centered under the keg 10, but off-center, allowing a true reading of the fluid level (20) about the dip tube 18 and approaching the end of the dip tube 18. The base 150 is not limited to a donut shape and is not limited to a full circle about a keg 10, but may be a smaller portion (for example, a semi-circle) having similar parts and functionality.

Figure 14:
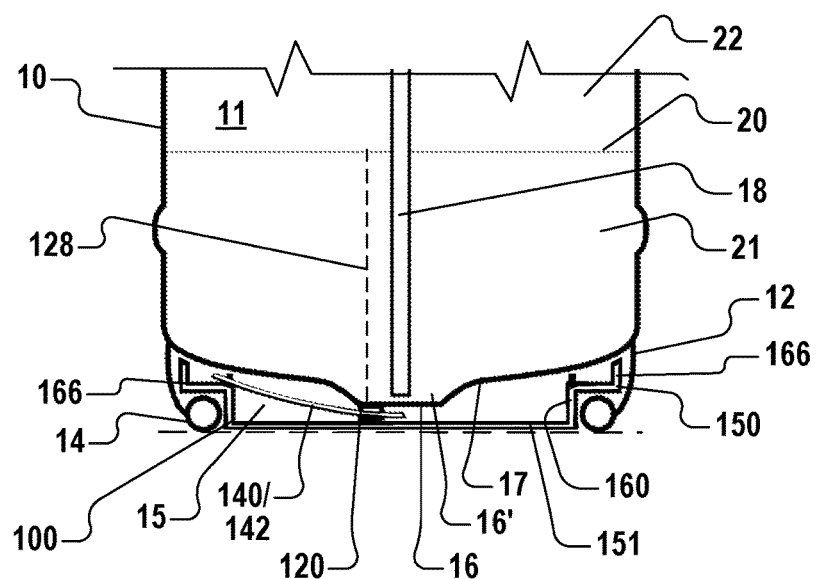
FIG. 14 is a cut-away side view of alternative features of a transducer positioning device in cross-section.

FIG. 14 illustrates several design alternatives. First, in an alternative to a base 150 having an outer wall 156, a positioning device 100 uses only an internal wall 160 for placing the device 100 fully within the false bottom 15 of a beverage keg 10. A variety of appendages 166 off of the inner wall 160 removably secure the base 150 to the chime 12. Second, the lower rim 14 of the keg 10 rests on the ground (indicated by a dashed line), so the bottom wall 151 of the base 150 may also rest within the false bottom 15 without bearing the weight of the beverage keg 10 on the ground. Third, a transducer support 140 may comprise one arm or spoke 142 reaching from the inner wall 160 to the sump wall 16. The transducer support 140 may comprise metal, carbon, polymer, a composite, or other material that combines stiffness with some spring, allowing the one spoke 142 to flex and to press at least one transducer 120 against the sump wall 16 or curved bottom 17.

Figure 15:
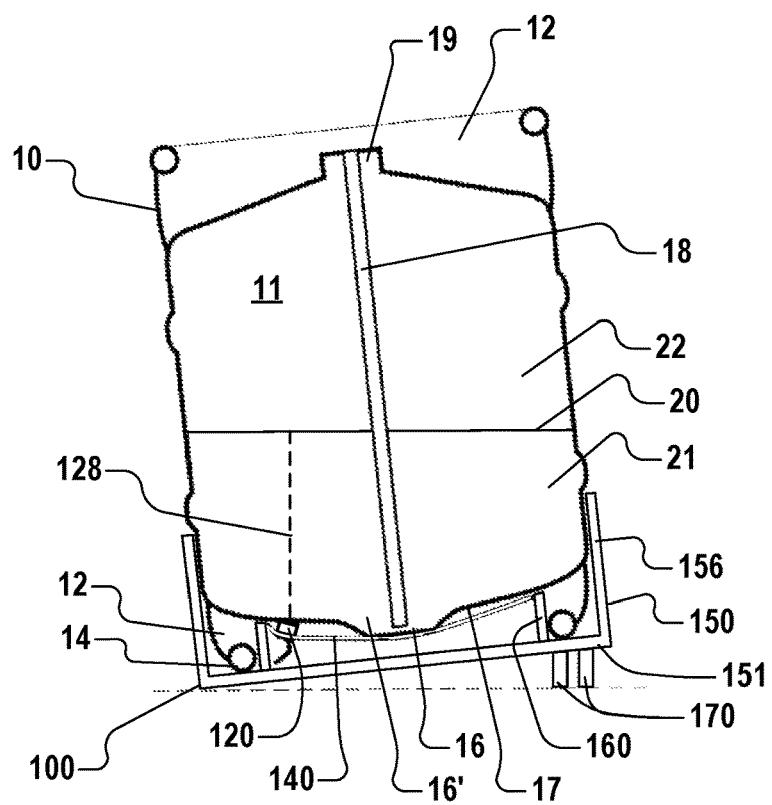
FIG. 15 is a side cross-section of a transducer positioning device with prop.

FIG. 15 discloses a prop 170 (for example, one or more legs) extending downward from a side of the base 150 to allow placement of a flat-faced transducer 120 on a curved bottom 17 of a beverage keg 10 without use of an angled adapter 130. The face 124 of the transducer 120 is oriented substantially parallel with the fluid level 20 for signals 128 to travel vertically. The prop 170 may be positioned at various places depending on the design/number of legs used. When a prop 170 is configured to provide tilt at the end of the base 150 opposite the transducer 120, then the prop 170 may be about 1.4" in height from the ground (dashed line) to the bottom wall 151 of the base 150. Thus the prop 170 corrects for the omitted 10-15° angled adapter 130. Although a tilted keg 10 may put the dip tube 18 in the path of the acoustic waves/signals 128, the size of the reflection from the fluid level 20 is much larger than any reflection off of the dip tube 18—the transducer 120 will track the fluid level 20 and ignore the dip tube 18. This is not the case with a transducer 120 placed under a vertically oriented dip tube 18.

Figure 16:
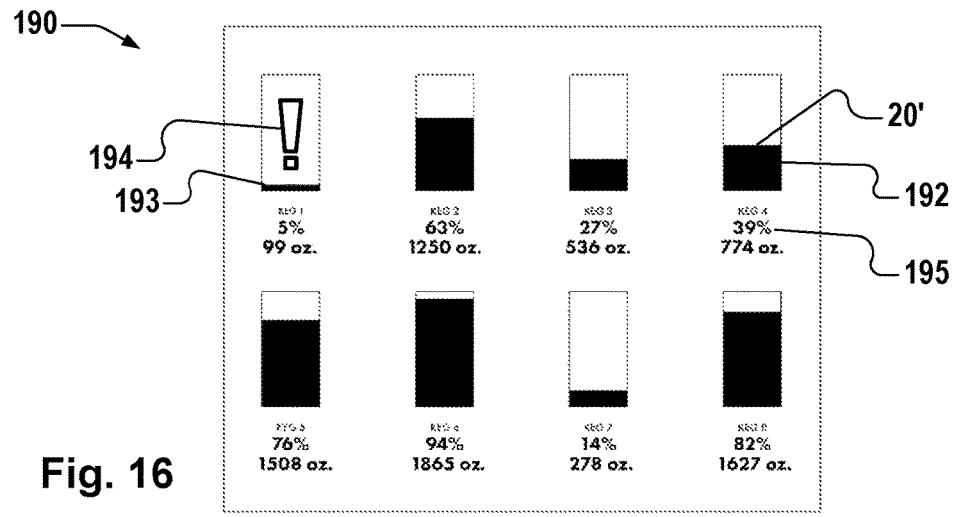
FIG. 16 is a user interface display.
Figure 17:
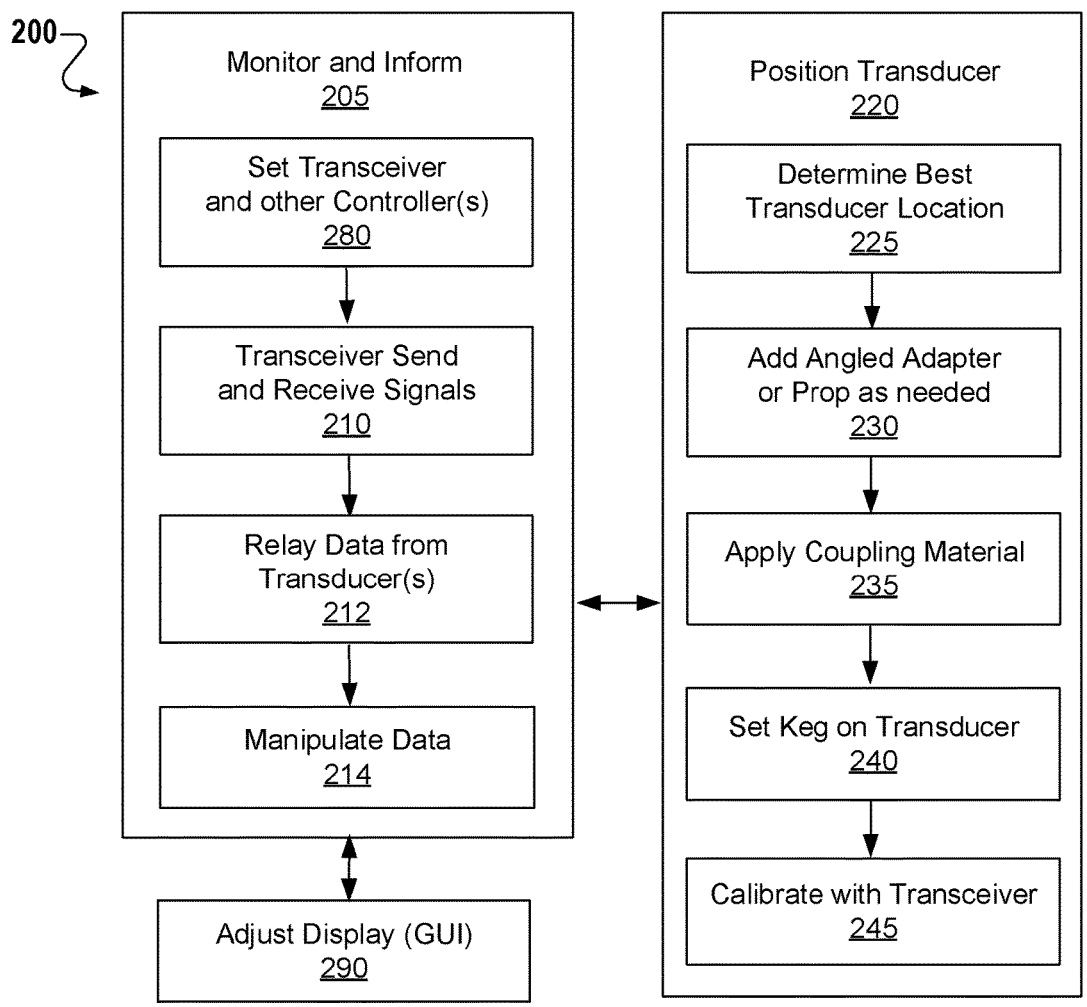
FIG. 17 is a chart illustrating a method for preventing a compressed gas blowout in a beverage keg.
Figure 18:
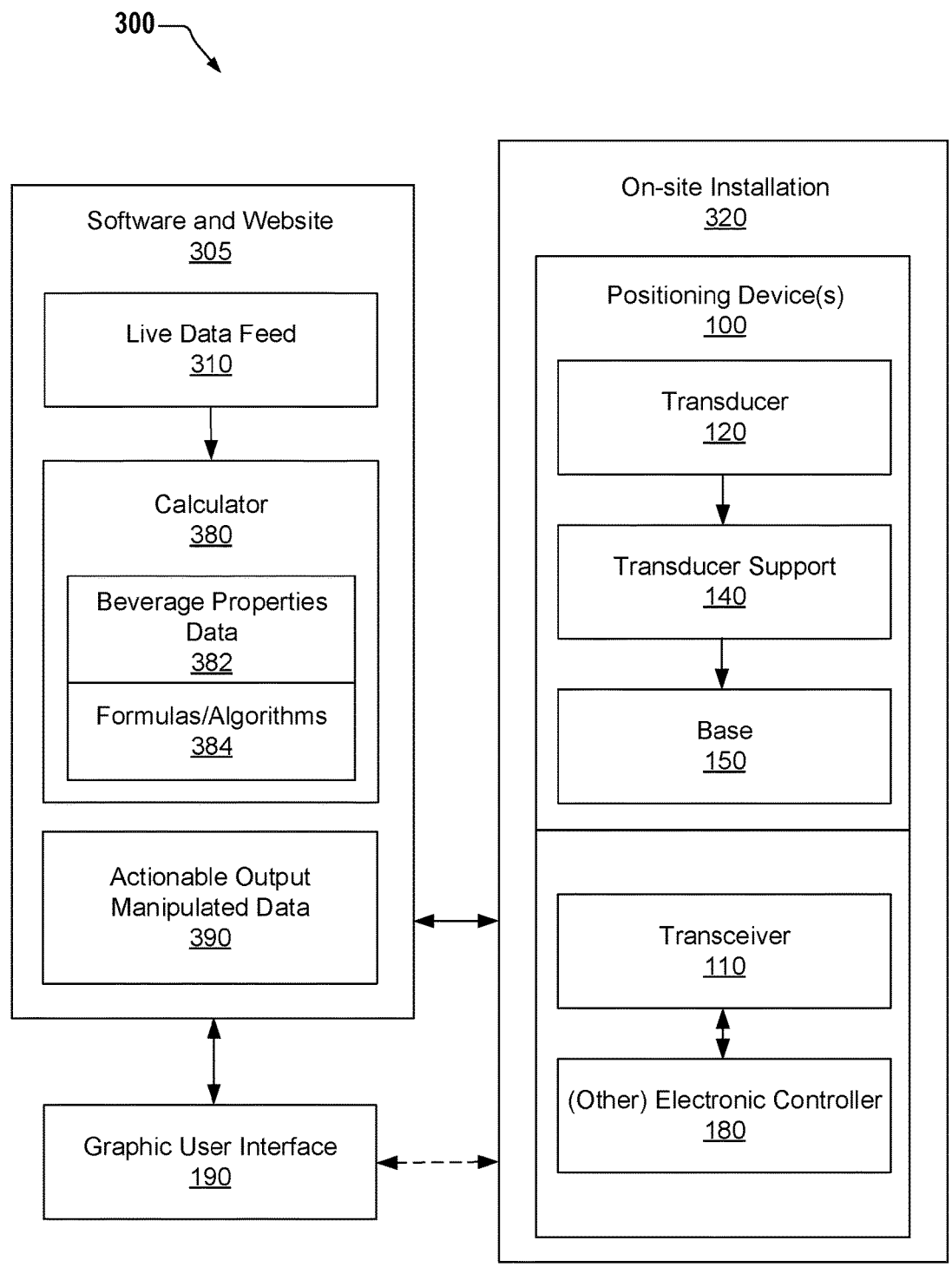
FIG. 18 is a chart illustrating a system for preventing a compressed gas blowout in a beverage keg.

Graphic user interfaces (GUI) or displays 190, an example of which is given in FIG. 16, allow bartenders and other interested parties to check their inventory and to receive both pre-programmed and custom alerts via app, texting, email, and other options. Standard kegs 10 typically blow when about 12 ounces of beverage remain; therefore, an alert may issue at about 8 ounces or ½" above the end of the dip tube 18. Each beverage keg 10 that is paired with a transducer 120 may be represented by an icon 192 that visually communicates the keg's 10 status. When the compressed gas 22 at the fluid level 20 nears a warning level 193 set to warn of entry into the dip tube 18, a warning indicator 194 may appear, a warning sound may issue, and/or a relay may be triggered. Warning levels 193 may be set by the bartender using the interactive display 190, which then informs any electronic controller 180, transceiver 110, and software 305. The system 300 is adaptive, and the warning level 193 for avoiding a gas 22 blowout may, and frequently will, differ from a setting that would allow the maximum amount of liquid 20 to be served. Numeric and other written data 195 including, but not limited to, the amount of beverage remaining (usable until blowout or total remaining) is associated with icons 192 on the display, along with the keg cooler room temperature. Any display 190 is envisioned to make use of a variety of colors, shapes, motions/action, fonts, etc. A new keg 10 may receive a new icon 192.

A method for preventing keg blowout 200 (see FIG. 17) is expressed as the overall steps of monitoring and informing 205, positioning a transducer 220, and adjusting a display 290. Monitoring and informing 205 may comprise setting at least one transceiver and other optional electronic controllers 280, sending and receiving signals to/from at least one transducer 210, relaying data from the at least one transducer 212, manipulating data 214, and adjusting a display 290 with actionable output. A user may also interactively adjust the display 290 to affect the cycle of monitoring and informing 205. Cooperating with, and arguably part of, the method just described, a user positions at least one transducer 220. Positioning a transducer 220 comprises determining the best transducer location 225 (i.e., sump wall 16 or curved bottom 17), employing an angled adapter or prop as needed 230, applying a coupling material 235, setting a keg on a transducer 240, and calibrating the transducer 120 with the transceiver 245. If the user sees that a transducer 120 is not sending and receiving properly, then the keg 10 must be repositioned. Positioning a transducer 220 is necessary for each keg 10 and transducer 120 pairing. In this method, certain of the steps are optional, and the order of the steps may in many instances be re-arranged or grouped differently than illustrated.

Calibrating the transducer 120 comprises a keg-to-transducer coupling check and initialization. For the system 300 to work properly, the transducer 120 must be well coupled to the "outer ring" portion of the sump 16 about the dip tube 18. When a new keg 10 is placed in the positioning device 100, the transceiver 110 goes through a unique program (part of the software 305) to determine if the transducer 120 is coupled sufficiently to the keg 10. The transceiver 110 can vary the burst frequency, amplitude of the burst, length of the burst, and receiver gain. While varying each of the previous parameters, the receiver monitors the received reflected wave and determines if a sufficient signal 128 is being obtained. The strength of the signal 128 is presented numerically and graphically. If a sufficient signal 128 is obtained, the installer is notified and no further action is required. If a sufficient signal 128 is not obtained in the current setting position, the GUI display 190 instructs the installer to remove the keg 10, apply more coupling material 127, and reposition the keg 10 on the base 150. Once the installer has repositioned the keg 10, the software 305 again runs through its steps and determines if a sufficient reflected signal 128 is being obtained. Some factors that can affect coupling are air bubbles between the transducer 120 and the keg 10, insufficient pressure forcing the transducer 120 against the keg 10, irregular keg 10 shape (dents) where the transducer 120 is coupled, wrong coupling material 127, and improper transducer 120 placement due to a different keg 10 shape from the norm.

A system for preventing a beverage keg blowout 300 (see FIG. 18) generally comprises software 305 (which may include a Website, an app, and other programmed forms), an on-site installation 320, and at least one display 190—and each of these three may interact with the others. Communication between those components may be via the Internet or any other means of data transmission. Wireless communication allows a user to access a status display 190 very conveniently, even on the go. An on-site installation 320 may comprise a transceiver 110, an electronic controller 180, and at least one transducer positioning device 100. The transducer positioning device 100 may comprise a transducer 120, a transducer support 140, and a base 150. A pressurized beverage keg 10 may or may not be a component of the system 300, depending on the frame of reference. Software 305 comprises a live data feed 310 (from an on-site installation 320), a calculator 380 comprising standard beverage properties data 382 and formulas/algorithms 384, and an actionable output of manipulated data 390. In this system 300, certain of the components are optional, and the components may in many instances be re-arranged or grouped differently than illustrated.

The electronic components of the system for preventing beverage keg blowout 300 may generally comprise: a piezoelectric transducer 120 that receives a first electrical pulse and responsively generates first acoustic energy 128 for transmission upwardly through the bottom wall 16, 17 of the beverage keg 10 and receives second acoustic energy 128 reflected from the fluid level 20 and responsively generates a second electrical pulse; an angled adapter 130 (as necessary) for coupling the transducer 120 to the bottom wall 16, 17 of the beverage keg 10 and causing the face 124 of the transducer 120 to be substantially parallel to the fluid level 20; a time measuring device that measures a time between generation of the first and second electrical pulses; and a transmitter that transmits the measured time to a software 305. A transceiver 110 may comprise a time measuring device and a transmitter.

It will be understood that many modifications could be made to the embodiments disclosed herein without departing from the spirit of the invention. Having thus described exemplary embodiments of the present invention, it should be noted that the disclosures contained in the drawings are exemplary only, and that various other alternatives, adaptations, and modifications may be made within the scope of the present invention. Accordingly, the present invention is not limited to the specific embodiments illustrated herein, but is limited only by the following claims.

I claim:

1. A device for non-intrusively measuring fluids in a beverage keg that has a pressurized vessel with a bottom and a dip tube, the device comprising:
   a transducer support configured to removably engage a sloped or curved area of the bottom of the keg's pressure vessel and to support and angularly orient at least one transducer at a location that is horizontally displaced from the center of the bottom of the keg's pressure vessel;
   at least one transducer mounted to the transducer support, which compensates for the sloped or curved area of the bottom of the keg's pressure vessel and orients the at least one transducer to send and receive a signal that travels vertically through the bottom of the pressure vessel to a fluid level in the keg and back through the bottom of the pressure vessel to the transducer.

2. The device of claim 1, wherein the at least one transducer includes a piezoelectric acoustic transducer.

3. The device of claim 1, wherein the transducer support is configured to flex as it presses the transducer against the curved bottom of the pressure vessel.

4. The device of claim 1, wherein the transducer support includes an approximately 10-15° angled adapter configured to be placed between the curved keg bottom and the flat face of the transducer.

5. The device of claim 1, further comprising a prop configured to tilt the transducer support and keg at approximately 10-15° to orient the flat face of the transducer parallel with the fluid level.

6. The device of claim 1, wherein the keg has a chime, a false bottom, and a substantially donut-shaped boot attached proximate the lower extremity of the keg's chime.

7. The device of claim 1, wherein the transducer support presses the at least one transducer against the pressure vessel's bottom indirectly and another material is between the at least one transducer and the pressure vessel's bottom.

8. The device of claim 1, wherein the transducer support is configured to locate the transducer within 2" of the center of a sump located in the center of the bottom of the pressure vessel.

9. The device of claim 1, further comprising a transceiver configured to communicate with the transducer and any other connected transducer.

10. A system for non-intrusively monitoring fluids to prevent blowout of a beverage keg having a pressure vessel, the system comprising:
a transducer positioning device comprising:
a transducer support configured to removably engage a sloped or curved area of the bottom of the keg's pressure vessel to support at least one transducer; and
the at least one transducer is mounted to the transducer support in a manner that compensates for the curvature of the curved bottom by orienting the transducer to send and receive a signal that travels vertically through the bottom of the pressure vessel to a fluid level in the keg and back through the bottom of the pressure vessel to the transducer;
a transceiver that sends a first electrical pulse to the transducer to cause transmission of a first acoustic energy, senses and filters a second electrical pulse returning from the transducer after the transducer receives a return acoustic energy, determines the time interval between the first and second electrical pulses, optimizes the second electrical pulse, and communicates system information with devices and apps; and
software that controls the transceiver and analyzes data from the transceiver.

11. The system of claim 10, further comprising a piezoelectric transducer.

12. The system of claim 11, wherein the software controls the transceiver to cause the piezoelectric transducer to sweep through frequencies in the range of 1.5-3 MHz and optimize for specific keg construction and beverage composition.

13. The system of claim 10, further comprising an approximately 10-15° angled adapter configured to be placed between the curved keg bottom and the flat face of the transducer.

14. The device of claim 10, further comprising a base configured to removably attach proximate the lower extremity of the keg's chime, wherein at least a portion of the base is configured to fit within the keg's false bottom to secure the transducer support.

15. The system of claim 10, wherein the transducer support is configured to locate the transducer within 2" of a center of the bottom of the pressure vessel.

16. A kit for monitoring the fluid levels of a plurality of beverage kegs, the kit comprising:
a plurality of transducer positioning devices, each device comprising:
a transducer support configured to flex and to removably engage a sloped or curved area of the bottom of the keg's pressure vessel; and
at least one transducer mounted to the transducer support which compensates for the sloped or curved area of the bottom of the keg's pressure vessel and orients and orients the at least one transducer to send and receive a signal that travels vertically through the bottom of the pressure vessel to a fluid level in the keg and back through the bottom of the pressure vessel to the transducer;
a transceiver that sends first electrical pulses to each transducer to cause transmission of a first acoustic energy, senses and filters a second electrical pulse returning from each transducer after the transducer receives a return acoustic energy, determines the time interval between the first and second electrical pulses for each transducer, optimizes the second electrical pulse from each transducer, and communicates system information with devices and apps; and
software that controls the transceiver and analyzes data from the transceiver;
wherein each transducer positioning device is configured to be paired with one keg.

17. A device for non-intrusively measuring fluids in a beverage keg that has a pressurized vessel and a dip tube, the device comprising:
a transducer support configured to removably engage the bottom of the keg's pressure vessel to support the transducer against the bottom of the keg's pressure vessel; and
at least one transducer mounted to the transducer support and oriented to send and receive a signal that travels vertically through the bottom of the pressure vessel to a fluid level in the keg and back through the bottom of the pressure vessel to the transducer;
wherein the transducer support is configured to press the transducer against the bottom of the pressure vessel at a location at least ½" away from the center of the keg's sump wall;
wherein the keg has a chime, a false bottom, and a removable base attached proximate the lower extremity of the keg's chime, the base further comprising a prop configured to tilt the transducer support and keg to orient the flat face of the transducer parallel with the fluid level.

18. The device of claim 17, wherein the prop is configured to tilt the transducer support and keg to an angle of approximately 10-15°.

* * * * *